(12) United States Patent
Dahlmeyer, Jr. et al.

(10) Patent No.: US 10,789,702 B2
(45) Date of Patent: Sep. 29, 2020

(54) SYSTEMS AND METHODS FOR ANALYZING A FABRIC ARTICLE

(71) Applicant: Henkel IP & Holding GmbH, Duesseldorf (DE)

(72) Inventors: Joseph D. Dahlmeyer, Jr., East Haven, CT (US); Wendy A. Saladyga, New Fairfield, CT (US)

(73) Assignee: Henkel IP & Holding GmbH (DE)

( * ) Notice: Subject to any disclaimer, the term of this patent is extended or adjusted under 35 U.S.C. 154(b) by 276 days.

(21) Appl. No.: 16/016,775

(22) Filed: Jun. 25, 2018

(65) Prior Publication Data
US 2019/0392568 A1    Dec. 26, 2019

(51) Int. Cl.
| | | |
|---|---|---|
| G06T 7/00 | (2017.01) | |
| G06T 5/00 | (2006.01) | |
| G06T 7/40 | (2017.01) | |
| D06F 34/18 | (2020.01) | |

(52) U.S. Cl.
CPC .............. *G06T 7/001* (2013.01); *D06F 34/18* (2020.02); *G06T 5/007* (2013.01); *G06T 7/40* (2013.01); *G06T 2207/10012* (2013.01); *G06T 2207/10152* (2013.01); *G06T 2207/30124* (2013.01)

(58) Field of Classification Search
CPC .............. D06F 34/18; G01N 21/8983; G06T 2207/10012; G06T 2207/10152; G06T 2207/30124; G06T 5/007; G06T 7/0004; G06T 7/001; G06T 7/40; G06T 7/586
See application file for complete search history.

(56) References Cited

U.S. PATENT DOCUMENTS

| | | | |
|---|---|---|---|
| 6,728,593 B2 | 4/2004 | Hu et al. | |
| 2005/0033470 A1 | 2/2005 | Hu et al. | |
| 2005/0094853 A1* | 5/2005 | Kang | G01N 21/8983 |
| | | | 382/111 |
| 2011/0304705 A1 | 12/2011 | Kantor et al. | |
| 2012/0139540 A1* | 6/2012 | Flood | D06F 9/00 |
| | | | 324/309 |

FOREIGN PATENT DOCUMENTS

WO    2018011173 A1    1/2018

OTHER PUBLICATIONS

"PillGrade M2276 Automated Pilling Grading System," accessed on May 25, 2018 from http://sdlatlas.com/products/pillgrade-automated-pilling-grading-system#product-details.pdf.
"PillGrade M2276 Automated Pilling Grading System: Calculates Precise Data for Pass/Fail Results More Consistent and Reliable than Subjective Pilling Grading," .pdf downloaded from www.sdlatlas.com on May 24, 2018.
Extended European Search Report EP 19178951.0 Completed: Aug. 9, 2019 dated Aug. 20, 2019 9 pages.

* cited by examiner

*Primary Examiner* — Manuchehr Rahmjoo
(74) *Attorney, Agent, or Firm* — Bojuan Deng (57) ABSTRACT

Systems and methods for analyzing a fabric article to determine fiber damage are provided herein. In an embodiment of a method for analyzing a fabric article, the fabric article is provided and at least one image of the fabric article is captured using a three-dimensional imaging device. The at least one image is processed using a contrast function to produce a processed data set that is representative of fiber damage in a viewing area of the three-dimensional imaging device. Optionally, a processed image is produced based upon the processed data set.

13 Claims, 3 Drawing Sheets

SYSTEMS AND METHODS FOR ANALYZING A FABRIC ARTICLE

TECHNICAL FIELD

The present disclosure generally relates to systems and methods for analyzing fabric articles, and more particularly relates to systems and methods of analyzing fabric articles to assess pilling/fuzzing of the fabric articles attributable to various stimuli.

BACKGROUND

Pilling and fuzzing are major concerns in the textile industry and result in significant apparent color fading and a general loss of appeal of fabric articles. Pilling and fuzzing are, more specifically, an effect observed on fabric articles whereby fiber damage results in a breakdown of surface appearance and texture in the fabric article, commonly manifesting as pills or agglomerations of fibers attached to the surface of the fabric articles or damaged, "fuzzy" areas where the fabric has been altered from its original form.

Pilling and fuzzing can have various root causes, from laundering chemicals and conditions to wear dynamics. While wear dynamics generally owe to the manner of use by a consumer or the fundamental properties of the fabric itself, it is possible to control laundering chemicals and conditions to minimize fiber damage. Oftentimes purchased fabric articles are provided with care instructions, e.g., instructions to avoid machine drying, hand-wash only, machine wash cold instructions, and the like. Additionally, chemistry of laundry formulations can have an effect on fiber damage, and it is possible for manufacturers of laundry formulations to modify or adapt the laundry formulations based upon fiber damage that is observed in various fabric articles due to use of the laundry formulations.

In order to understand the propensity of fabric articles to experience fiber damage, and the effects of laundry formulations on fiber damage mechanisms, objective testing is desirable for assessing fiber damage. Assessment of fiber damage, e.g., pilling and fuzzing, has traditionally been carried out by optical analysis. A PillGrade Automated Grading System is commercially available from SDL Atlas LLC of Rock Hill, S.C. and is configured to optically scan fabric articles for surface properties. More specifically, the PillGrade Automated Grading System is configured to detect the size, number, and locations of pills in fabric articles that are assessed with the system by employing a camera and a series of mirrors to provide different viewing angles of the fabric surface. During assessment, the PillGrade Automated Grading System feeds fabric through rollers that bend the fabric at about a 90° C. angle. Based upon the measured surface properties, the PillGrade Automated Grading System rates fiber damage in the fabric article on a 1-5 scale in accordance with ASTM D 3514, with "1" representing the most severe degree of pilling. Despite the methodical approach to determining fiber damage enabled by the PillGrade Automated Grading System, the 1-5 scale is often not sufficiently selective to separate fabric articles with different degrees of fiber damage. When assessing impact of laundry formulations on fiber damage to fabric articles, the PillGrade Automated Grading System and 1-5 rating scale is often not sufficiently sensitive to provide useful data that can guide reformulation of the laundry formulations.

Accordingly, it is desirable to provide systems and methods for analyzing fabric articles with increased sensitivity to differentiate fiber damage between different fabric articles. It is also desirable to provide systems that enable more accurate assessment of fiber damage attributable to laundry formulations as compared to existing grading systems. Furthermore, other desirable features and characteristics of the present disclosure will become apparent from the subsequent detailed description and the appended claims, taken in conjunction with the accompanying drawings and this background.

BRIEF SUMMARY

Systems and methods for analyzing a fabric article to determine fiber damage are provided herein. In an embodiment of a method for analyzing a fabric article, the fabric article is provided and at least one image of the fabric article is captured using a three-dimensional imaging device. The at least one image is processed using a contrast function to produce a processed data set that is representative of fiber damage in a viewing area of the three-dimensional imaging device. Optionally, a processed image is produced based upon the processed data set.

In another embodiment, a method for analyzing fiber damage in a fabric article attributable to a laundry formulation is provided. In accordance with the method, a fabric article is provided. The fabric article is laundered using a first laundry formulation. At least one image of the fabric article is captured using a three-dimensional imaging device after laundering the fabric article using the first laundry formulation. The at least one image is processed using a contrast function to produce a processed data set representative of fiber damage in a viewing area of the three-dimensional imaging device. Optionally, a processed image is produced based upon the processed data set.

In another embodiment, a system for analyzing fabric articles is provided. The system includes a fabric article that is free of stains or extraneous material. The system further includes a three-dimensional imaging device. The three-dimensional imaging device is configured to capture images through a photometric stereo technique.

BRIEF DESCRIPTION OF THE DRAWINGS

The present disclosure will hereinafter be described in conjunction with the following drawing figures, wherein like numerals denote like elements, and FIG. 1 schematically illustrates a system and method for analyzing a fabric article in accordance with an embodiment.

DETAILED DESCRIPTION

The following detailed description is merely exemplary in nature and is not intended to limit the systems and methods for analyzing a fabric article as described herein. Furthermore, there is no intention to be bound by any theory presented in the preceding background or the following detailed description.

Systems and methods for analyzing fabric articles are provided herein that provide increased sensitivity to differentiate fiber damage between different fabric articles, as compared to differentiation that is possible using conventional systems or through visual observation. In particular, the systems and methods employ a three-dimensional imaging device to capture at least one image of the fabric article, and a plurality of images may be captured using the three-dimensional imaging device. The three-dimensional imaging device processes the at least one image using a contrast function to produce a processed data set that is representative of fiber damage in a viewing area of the three-dimensional imaging device. For example, the processed data set may include measurements of variables such as, but not limited to, surface roughness, elevation density, and/or depression density. Optionally, a processed image is produced based upon the processed data set. Statistical analysis of the processed data set may be conducted, e.g., through Tukey analysis, to reveal statistically similar or different relationships between the data sets. It has been discovered that by using the three-dimensional imaging devices as described herein, which capture the at least one image and process the at least one image using the contrast function to register depth of an imaged surface, increased sensitivity is observed for purposes of analyzing fiber damage as compared to results obtained through visual observation or by using conventional grading systems (such as the PillGrade Automated Grading System). Without being bound by theory, it is believed that bending and movement of the fabric through rollers, as is done by the PillGrade Automated Grading System during assessment, leads to variability and less sensitivity whereas the methods as described herein may be carried out with the fabric article stationary and generally flat during assessment. As a result, differentiation in fiber damage measurement is possible between fabric articles that, using conventional grading systems, would otherwise be grouped as exhibiting similar fiber damage. The increased sensitivity is particularly useful for assessment of fiber damage attributable to laundry formulations as compared to existing grading systems, thereby enabling more robust testing and optimization of laundry formulations based upon the assessment of fiber damage caused by the laundry formulations.

An embodiment of a system and method for analyzing a fabric article will now be described with reference to FIG. 1. The system 10, as referred to herein, includes devices and materials that contribute to production of a data set 50 that is representative of fiber damage of the fabric article 12. In this regard, an exemplary system 10 includes a fabric article 12 and a three-dimensional imaging device 14, although it is to be appreciated that the system 10 may further include additional optional devices and/or materials that are employed to yield the desired data set 50.

As contemplated herein, the fabric article 12 subject to analysis is a clean fabric article, with analysis conducted to assess fiber damage in the fabric article 12. In this regard, in embodiments, the fabric article 12 is free from a stain or extraneous material. More particularly, the fabric article 12 is desirably free from any visibly detectable substance that is unintended to be present in and/or on the fabric article 12. As contemplated herein, stains and extraneous materials do not include any substance that is intended to remain in or on the fabric article 12 after laundering, such as dye, water-proofing treatments, and the like. The fiber in the fabric article 12 may be any conventional natural or synthetic fiber. Further, the fabric article 12 may be subject to post-production conditions that produce at least some fiber damage in the fabric article. By "post-production", it is meant any processing or handling that is conducted after the fabric article is formed. Such post-production processing or handling may include laundering, accelerated wearing, or other processing that is intended to induce fiber damage. Laundering techniques employed in conjunction with exemplary methods may include multiple laundering cycles using a laundry formulation for purposes of observing fiber damage attributable to the laundry formulation. For example, the fabric article may be laundered through 5 or more laundering cycles, 20 or more laundering cycles, or 30 or more laundering cycles. Additionally, in accordance with the methods described herein and as described in further detail below, it is to be appreciated that multiple different fabric articles may be laundered using different laundry formulations to observe the relative effect of each laundry formula on fiber damage. In embodiments, the fabric article has a sufficient surface area to allow effective analysis of a surface 16 thereof using the three-dimensional imagine device 14. For example, in embodiments, the fabric article 12 has a uniform surface 14 with a surface area of at least 4 $cm^2$.

In accordance with the exemplary method, at least one image of the fabric article 12 is captured using the three-dimensional imaging device 14, and a plurality of images of the fabric article 12 may be captured using the three-dimensional imaging device 14. More particularly, the at least one image is processed using a contrast function to produce a data set 50 that is representative of fiber damage in a viewing area 18 of the three-dimensional imaging device 14. For example, the data set 50 may include measurements of variables such as, but not limited to, surface roughness, elevation density, and/or depression density.

In accordance with the present disclosure, the three-dimensional imaging device 14 is a commercially available imaging device, and new imaging devices 14 are not contemplated by the present disclosure. Thus, while suitable three-dimensional imaging devices 14 are described herein, it is to be appreciated that various features and operation of the imaging devices 14 are endemic to the three-dimensional imaging device 14 as obtained from the manufacturer of the imaging device 14.

Figure 1:
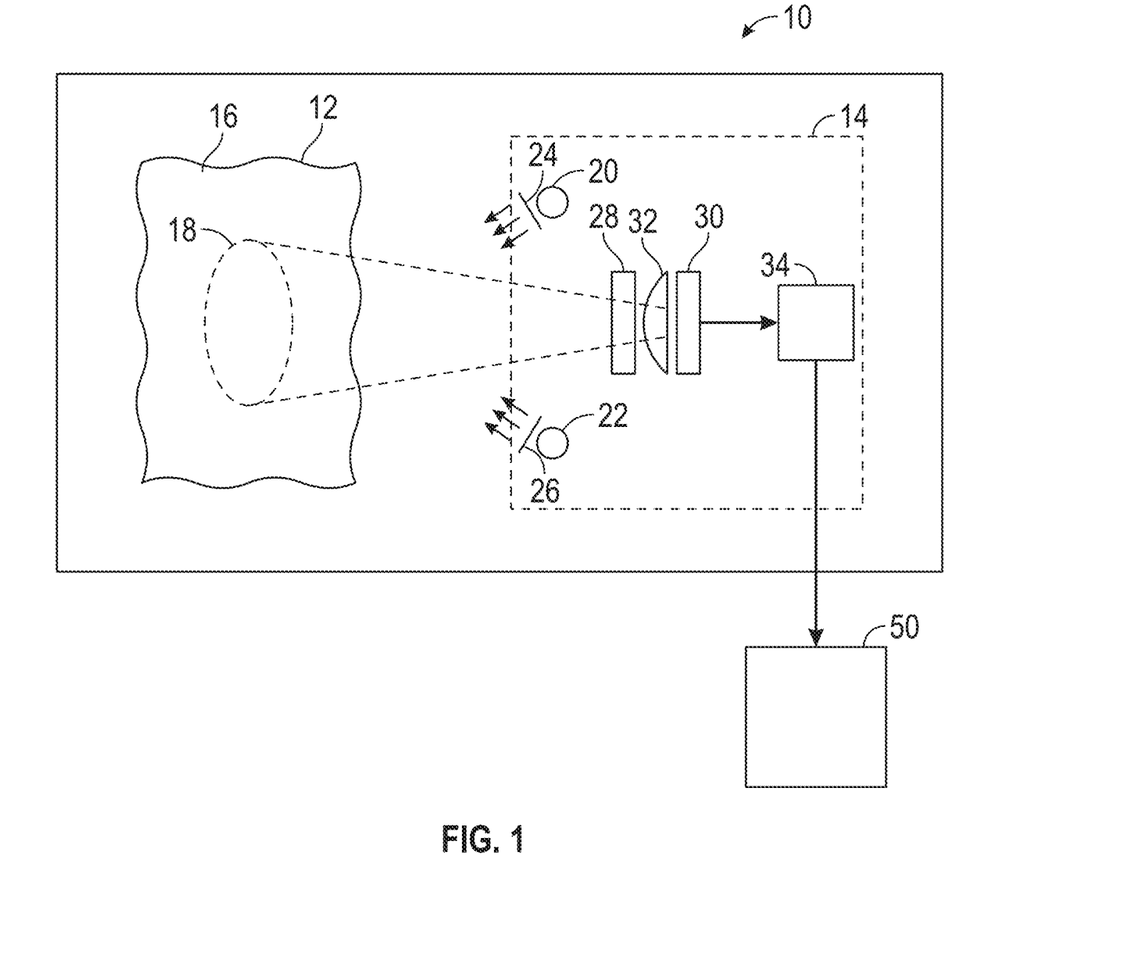

Referring to FIG. 1, in embodiments, the three-dimensional imaging device 14 is configured to capture images through a "photometric stereo" technique. In the photometric stereo technique, a plurality of images of a substantially similar viewing area 18 are captured by the imaging device 14 with a different illumination direction for each of the plurality of images and with a constant viewing direction or viewpoint to produce the images having different spatial properties.

Referring again to FIG. 1, in embodiments, the three-dimensional imaging device 14 includes a plurality of separate illumination sources 20, 22, such as light emitting diodes (LEDs), that are positioned to illuminate the viewing area 18 of the imaging device 14 at different angles for purposes of capturing images through the photometric stereo technique. While only two illumination sources 20, 22 are shown in FIG. 1, it is to be appreciated that a number of additional illumination sources may be employed. In this embodiment, the imaging device 14 further includes an image sensor 30 and one or more lenses 32 positioned to focus images on the image sensor 30. In embodiments, the three-dimensional imaging device 14 may include an arrangement of filters 24, 26, and/or 28 that are configured to suppress specular reflection by minimizing capture of the specular reflection. For example, in embodiments and as shown in FIG. 1, the filters 24, 26, and/or 28 may be polarization filters that are positioned between the illumination source(s) 20, 22 and the surface 16 in the viewing area 18 of the imaging device 14 and/or between the image sensor 30 and the surface 16 in the viewing area 18 of the imaging device 14. The various filters 24, 26, 28 may be configured to filter electromagnetic radiation of predetermined intensity and/or wavelength prior to capturing an image of the surface 16 in the viewing area 18 using the image sensor 30. Although not shown, it is to be appreciated that the imaging device 14 may further include additional elements, such as features for shaping the illumination (e.g., light condensers and/or diffusers), additional polarization filters, imaging apertures, and other features that are conventional within three-dimensional imaging devices. In one specific embodiment, the three-dimensional imaging device 14 is an Antera 3D® camera, commercially available from Miravex of Dublin, Ireland.

As also shown in FIG. 1, the three-dimensional imaging device 14 further includes a computer processor 34 that is configured to process at least one image captured by the three-dimensional imaging device 14 using a contrast function. The contrast function is described in further detail below. An output produced using the contrast function as applied by the computer processor 34 to process the at least one image is provided by the imaging device 14.

With continued reference to FIG. 1, and as alluded to above, at least one image of the surface 16 of the fabric article 12 is captured using the three-dimensional imaging device 14. In accordance with an exemplary embodiment, a plurality of images of a substantially similar viewing area 18 on the surface 16 of the fabric article 12 are captured using the three-dimensional imaging device 14, with the plurality of images having different spatial properties lending to illumination of the viewing area 18 with a different illumination direction for each of the images. By "different illumination direction", it is meant that varying levels of illumination intensity and/or illumination configurations are employed using the illumination sources 20, 22 to effectively provide different illumination conditions for each captured image. While FIG. 1 illustrates illumination sources 20, 22 simultaneously emitting illumination, in practice, it is to be appreciated that only one of the illumination sources 20, 22 may emit illumination for each captured image. Alternatively, more than one illumination source 20, 22 may be illuminated for each captured image but with different illumination intensities employed for each captured image. It is to be appreciated that while only two illumination sources 20, 22 are shown in FIG. 1, numerous additional illumination sources may be employed with varying levels of illumination intensity and illumination configurations employed to provide the plurality of captured images with a different illumination direction for each of the images.

In embodiments, specular reflection from the surface 16 of the fabric article 12 is suppressed during image capture of the at least one image. For example, the specular reflection may be suppressed by one or more of polarization filtering or selective elimination of data from the data set 50 that is attributable to specular reflection. As one specific example, electromagnetic radiation of predetermined intensity and/or wavelength is filtered, e.g. using the arrangement of filters 24, 26, 28, prior to capturing the images using the image sensor 30. In embodiments, electromagnetic radiation that is attributable to specular reflection from the viewing area 18 is filtered using the arrangement of filters 24, 26, 28, with filtering conducted through conventional operation of the three-dimensional imaging device 14, such as the Antera 3D® camera.

As alluded to above, the at least one captured image is processed using a contrast function to produce a data set 50 representative of fiber damage in the viewing area 18 of the three-dimensional imaging device 14. As also set forth above, the three-dimensional imaging device 14 may be a commercial product. Thus, execution of the contrast function may proceed based upon programmed function from the manufacturer of the imaging device 14 with the imaging device 14 operated in a conventional manner but with images taken of the surface 16 of the fabric article 12 as opposed to other articles. In embodiments, the contrast function is executed by the computer processor 34 to generate a visual contrast between areas of high light absorbance of light from the illumination source(s) 20, 22 and areas of low/no absorbance of light from the illumination source(s) 20, 22. For example, in embodiments, the illumination source(s) 20, 22 emits light in a plurality of specific wavelengths that include the entire visible spectrum from UV to IR wavelengths. Radiation from the illumination source(s) 20, 22 penetrates to different depths on the surface 16 of the fabric article 12, with differences in measured intensity of diffuse radiation yielded based upon presence of pores, depressions, or changes in elevation on the surface 16. The computer processor 34 produces spectral curves that are based upon diffuse radiation measured at each wavelength emitted by the illumination source(s) 20, 22. The spectral curves are used to calculate tristimulus values XYZ and L*a*b* color values. This calculation may be performed for each pixel within the camera's field of view. Based upon differences between the pixels, the data set 50 may be generated. In embodiments, the data set 50 includes a measurement of at least one variable chosen from surface roughness (in mm), elevation density (in mm3 standardized for the portion of the surface 16 in the viewing area 18 across various samples), or depression density (in mm3 standardized for the portion of the surface 16 in the viewing area 18 across various samples), and such variables can be directly obtained from the measured contrast in intensity between pixels. Optionally, electromagnetic radiation of predetermined intensity and/or wavelength is filtered prior to generating the visual contrast. In this manner, enhanced contrast between elevation changes/pore presence in the surface 16 of the fabric article 12 can be achieved.

The aforementioned variables of surface roughness, elevation density, and depression density are affected by and directly correlate to a degree of fiber damage on the surface 16 of the fabric article 12, and it has been found that distinct processed data sets based upon the aforementioned variables may be obtained across different fabric articles 12 based upon a degree of fiber damage within the fabric articles 12. To explain, fiber damage manifests as pilling and/or fuzzing of the surface 16 of the fabric article 12, and such pilling and/or fuzzing changes the texture of the surface 16 in a way that is measurable using the three-dimensional imaging device 14 in accordance with the methods described herein. More particular, elevation changes can be observed on the surface 16 where pills or fuzzed regions exist, and the contrast function provides for sensitive detection of such changes as will be apparent from the Examples contained herein.

Figure 4:
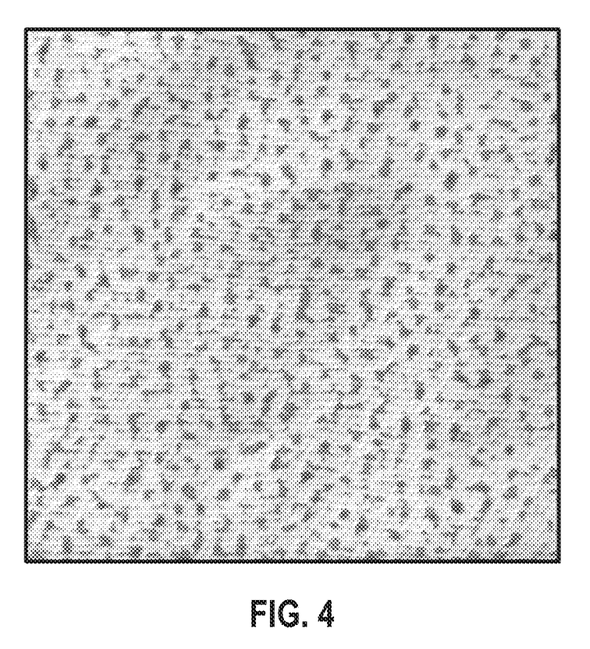
FIG. 4 is a photograph of a portion of a fabric article captured using an Antera 3D® camera and after applying the contrast function.
Figure 5:
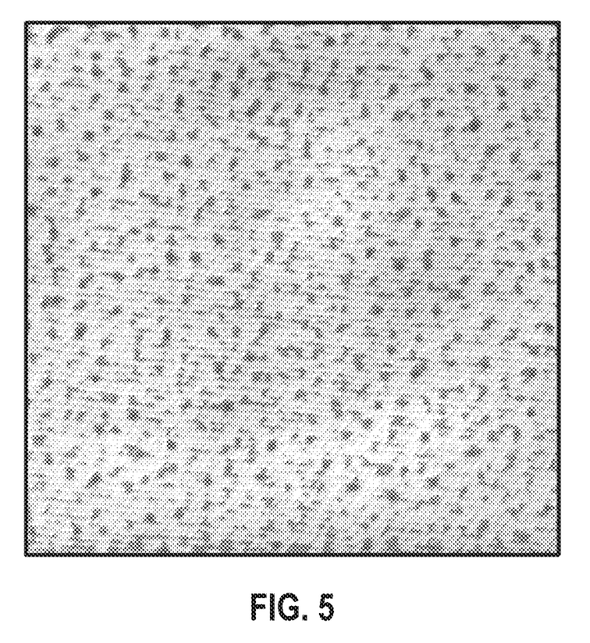
FIG. 5 is a photograph of a portion of another fabric article captured using an Antera 3D® camera and after applying the contrast function, showing less pilling/fuzzing than the fabric article of FIG. 4.

In embodiments, the processed data set 50 is employed for purposes of comparison to other processed data sets. In other embodiments, a processed image that is based upon the processed data set may be produced, which may be used for internal analysis or for marketing purposes to show fiber damage in fabric articles 12. Referring momentarily to FIGS. 4 and 5, processed images are shown that are based upon processed data sets that are produced by the Antera 3D® camera.

In accordance with an exemplary method, comparisons may be made between different fabric articles for purposes of assessing differences in fiber damage therebetween. For example, in an embodiment, at least one image of one or more additional fabric articles is captured using the three-dimensional imaging device, and the at least one image of the one or more additional fabric articles is processed using the contrast function to produce additional processed data set(s) representative of fiber damage in the viewing area of the three-dimensional imaging device. The one or more additional fabric articles may be subject to different fiber-damaging conditions, e.g., different laundering techniques, laundry formulations, laundering conditions, or other post-production processing, for purposes of assessing relative fiber damage between the fabric articles. The methods as described herein may be particularly useful for purposes of analyzing fiber damage in fabric articles that is attributable to laundry formulations, and the methods may be employed to direct optimization of the laundry formulations based upon materials that cause lesser degrees of fiber damage.

In embodiments in which the methods as described herein are employed to analyze fiber damage in fabric articles that is attributable to laundry formulations, a first fabric article may laundered using a first laundry formulation. To observe long-term fiber damage effects resulting from repeated use of the laundry formulation, the first fabric article may be repeatedly laundered using the first laundry formulation prior to capturing the at least one image of the fabric article with the three-dimensional imaging device. The at least one image of the fabric article is then captured using a three-dimensional imaging device in accordance with the description above. One or more additional fabric articles are then laundered using a modified laundry formulation that is different from the first laundry formulation. In embodiments, all other laundering conditions may be held constant. Particular modifications to the laundry formulation are unimportant for purposes of the present application, the primary focus being rather on the analytical methodologies described herein that are employed for purposes of assessing fiber damage.

Statistical analysis of the processed data sets from the fabric article and the one or more additional fabric articles may be conducted to assess relative fiber damage observed between the fabric articles that are subject to testing. One useful technique for determining whether a statistical difference exists between the processed data sets is a Tukey least squared statistical analysis (i.e., Tukey analysis). Least squared mean values for roughness, elevation density, or depression density can be determined by using JMP statistical software. In embodiments, when the Antera 3D® camera is employed, the least squared mean values may be provided using pre-programmed functions of the camera and the values can be gathered as an output from the camera. For the Tukey analysis, a relationship between the processed data sets is assessed according to the following comparison:

$$q_r = \frac{\bar{y}_L - \bar{y}_S}{\sqrt{\frac{MS_{error}}{n}}} > q_{critical} \quad \text{(FORMULA I)}$$

where
$\bar{y}_L$ is the larger of two means that are being compared;
$\bar{y}_S$ is the smaller of the two means that are being compared;
$MS_{error}$ is the mean of the variations within all data sets;
n is the sample size for each data set; and
$q_{critical}$ is tabulated for each specific confidence interval and incorporates the following:
  α=probability to reject null;
  K=number of populations;
  dF=degrees of freedom.

The mean value of concern is calculated through standard conventions by considering the individual values for fabric articles subject to analysis. The statistical analysis is then completed using the JMP statistical software and a connected letter report is generated depending on the relationships generated by Tukey analysis as represented by FORMULA 1. Q critical is also determined by the software based on the degrees of freedom in the analysis, the number of test replicates, and the probability (alpha) to reject the null (in embodiments according to the present disclosure, alpha was determined to be 0.05). These values are pre-tabulated based on the previous variables. If the relationship of FORMULA I is true, then the means that are subject to analysis are statistically different and are categorized as a different letter in the connected letter report, but if the relationship of FORMULA I is false, then the means that are subject to analysis are statistically similar and are grouped within the same letter in the connected letter report.

In accordance with embodiments of an exemplary method, the processed data sets from analysis of different fabric articles may be determined to be statistically different using the Tukey least squared statistical analysis. In such circumstances, one or more of the laundry formulations may be reformulated based upon determining that the processed data sets are statistically different. Information obtained from the analysis may direct reformulation of the laundry formulations, and may provide insights into slight changes in fiber damage attributable to certain components of the laundry formulations that were not previously observable using conventional methods and systems.

The following Examples are intended to supplement the present disclosure and are not to be interpreted as limiting the subject matter as contemplated herein.

EXAMPLES

Various samples of fabric articles were prepared and analyzed for fiber damage using conventional techniques and devices and also using techniques and devices as contemplated in the present disclosure. The various samples were laundered using various laundry formulations after either 5 washing cycles or 30 washing cycles to illustrate differences in fiber damage that are capable of assessment using conventional techniques and devices and using the techniques and devices as contemplated in the present disclosure.

Figure 2:
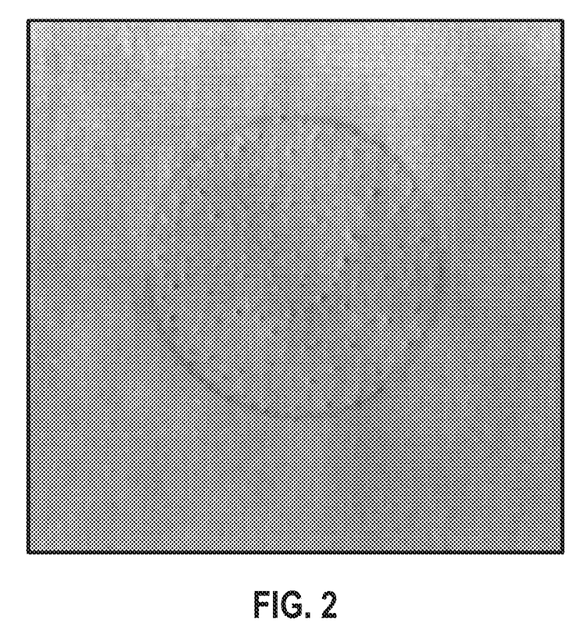
FIG. 2 is a comparative photograph of a portion of a fabric article, representing a view akin to the perception by the human eye and with the fabric article having a pill score of 1 in accordance with ASTM D3514.
Figure 3:
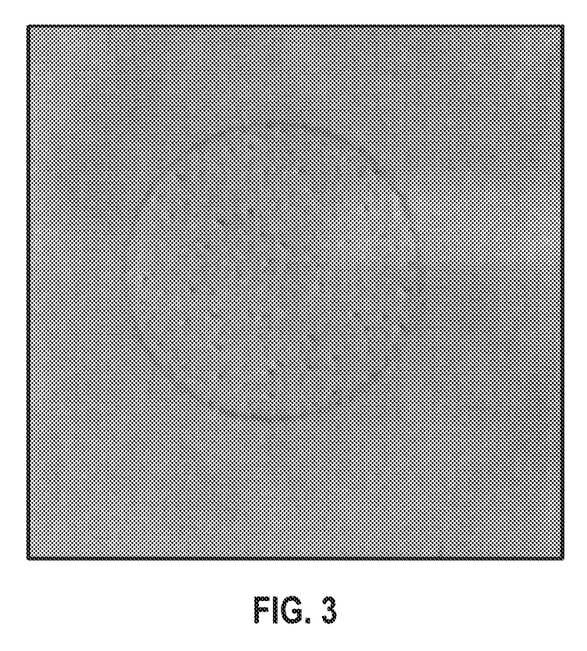
FIG. 3 is a comparative photograph of a portion of a fabric article, representing a view akin to the perception by the human eye and with the fabric article having a pill score of 2 in accordance with ASTM D3514.

Referring to FIGS. 2 and 3, visual assessment of fiber damage between two different fabric articles is illustrated. FIGS. 2 and 3 represent examples of the shortcoming of using a visual grading scale. As is shown, FIG. 2 represents the most severe pilling as determined through ASTM D 3514, graded at "1", while FIG. 3 represents severe pilling, graded at "2". Based upon visual observation, the fabric articles of FIGS. 2 and 3 are very similar and are not easily distinguishable on a visual basis, and anything that would fall between the ratings of the fabric articles in FIGS. 2 and 3 would be left up to the judgement of the observer.

Accuracy and precision are lost when using such a restricted and subjective scale and measurement technique.

Provided in TABLE I below are statistical data generated using a PillGrade Automated Pilling Grading System by SDL Atlas for analyzing fiber damage of pre-pilled 50:50 cotton:polyester that was laundered through 5 wash cycles using various laundry formulations. The PillGrade Automated Pilling Grading System conforms to both ASTM and ISO standards for evaluating fiber damage. Designations within the same alphabetical category (e.g., "A") denote least square mean values that are statistically similar and not distinguishable, as determined through Tukey analysis.

TABLE I

Pre-pilled 50:50 cotton:poly - 5 washes - PillGrade

|  |  | Least Square Mean |
|---|---|---|
| Detergent 1 w/0.05% Cellulase | A | 3.8979167 |
| Detergent 1 w/0.1% Cellulase | A | 4.1875 |
| Detergent 1 w/0.2% Cellulase | A | 3.9875 |
| Detergent 1 w/0.5% Cellulase | A | 4.0770833 |
| Detergent 1 w/0.5% Cellulase + 1 ppm Chlorine | A | 3.95625 |
| Detergent 2 | A | 4.0395833 |
| Detergent 3 | A | 3.9604167 |
| Detergent 4 | A | 3.9145833 |
| Detergent 5 | A | 3.7458333 |

As is shown, the Automated Pilling Grading System was unable to differentiate fiber damage between any of the fabric articles on the standard 1-5 scale after 5 wash/dry cycles, with all of the tested samples determined to be statistically similar. The lack of statistical differentiation, despite the observed unit differences, highlights the inherent variability in this measurement technique using the Automated Pilling Grading System.

Provided in TABLE II below are statistical data for surface roughness generated using an Antera 3D® camera for analyzing fiber damage of the same fabric articles as provided in TABLE I to illustrate higher sensitivity of the Antera 3D® camera. In particular, the tested fabric articles are pre-pilled 50:50 cotton:polyester that was laundered through 5 wash cycles using various laundry formulations. Designations within the same alphabetical category (e.g., "A") denote least square mean values that are statistically similar and not distinguishable, as determined through Tukey analysis.

TABLE II

Pre-pilled 50:50 cotton:poly - 5 washes - Antera 'Roughness' Score

|  |  |  |  |  | Least Square Mean |
|---|---|---|---|---|---|
| Detergent 1 w/0.05% Cellulase |  |  | C | D | 13.949083 |
| Detergent 1 w/0.1% Cellulase |  |  |  | D | 13.642958 |
| Detergent 1 w/0.2% Cellulase |  |  |  | D | 13.720771 |
| Detergent 1 w/0.5% Cellulase |  |  | C | D | 13.960667 |
| Detergent 1 w/0.5% Cellulase + 1 ppm Chlorine | A | B | C |  | 14.268417 |
| Detergent 2 | A |  |  |  | 14.562979 |
| Detergent 3 | A | B |  |  | 14.427438 |
| Detergent 4 |  | B | C |  | 14.153313 |
| Detergent 5 | A | B |  |  | 14.430313 |

As is shown, the Antera 3D® camera was able to differentiate fiber damage, on the basis of surface roughness measurement, between many of the fabric articles as tested and shown in TABLE I after 5 wash/dry cycles. The ability to yield statistical differentiation between many of the fabric articles highlights the superior sensitivity of the Antera 3D® camera for purposes of measuring fiber damage as compared to measurements yielded by the PillGrade system.

Additional fiber damage testing was conducted using both the Automated Pilling Grading System and the Antera 3D® camera, using the same laundry formulations, but with 30 wash/dry cycles. Further, instead of roughness values, elevation density measurements from the Antera 3D® camera were used for purposes of observing fiber damage. TABLE III below provides statistical data generated using the PillGrade Automated Pilling Grading System.

TABLE III

Pre-pilled 50:50 cotton:poly - 30 washes - PillGrade

|  |  |  |  | Least Square Mean |
|---|---|---|---|---|
| Detergent 1 w/0.05% Cellulase |  | B | C |  | 3.1333333 |
| Detergent 1 w/0.1% Cellulase | A | B |  |  | 3.3562500 |
| Detergent 1 w/0.2% Cellulase | A | B |  |  | 3.3583333 |
| Detergent 1 w/0.5% Cellulase | A |  |  |  | 3.6458333 |
| Detergent 1 w/0.5% Cellulase + 1 ppm Chlorine |  | B | C | D | 2.8958333 |
| Detergent 2 |  | B | C | D | 2.9375000 |
| Detergent 3 |  |  |  | D | 2.6062500 |
| Detergent 4 |  | B | C | D | 3.0375000 |
| Detergent 5 |  |  | C | D | 2.6708333 |

TABLE IV below provides statistical data generated using the Antera 3D® camera, with least square mean values obtained from measured values for elevation density.

TABLE IV

Pre-pilled 50:50 cotton:poly - 30 washes - Antera "Elevation Density" Score

|  |  |  |  |  | Least Square Mean |
|---|---|---|---|---|---|
| Detergent 1 w/0.05% Cellulase |  | B | C | D |  | 22.978958 |
| Detergent 1 w/0.1% Cellulase |  |  |  | D |  | 22.068125 |
| Detergent 1 w/0.2% Cellulase |  |  |  | D |  | 22.128542 |
| Detergent 1 w/0.5% Cellulase |  |  |  |  | E | 20.223333 |
| Detergent 1 w/0.5% Cellulase + 1 ppm Chlorine |  |  | C | D |  | 22.725625 |
| Detergent 2 | A |  |  |  |  | 25.997708 |
| Detergent 3 | A |  |  |  |  | 25.829792 |
| Detergent 4 |  | B | C |  |  | 23.315208 |
| Detergent 5 |  | B |  |  |  | 23.712917 |

Based upon comparison of the data in TABLE III and TABLE IV, the Antera 3D® camera was able to differentiate fiber damage with higher sensitivity than possible using the PillGrade system, on the basis of elevation density measurement. More particularly, the Antera 3D® camera produced elevation density measurements that enable further subgrouping of the various fabric articles as tested than what was possible using the PillGrade system after 30 wash/dry cycles. The ability to yield greater statistical differentiation between many of the fabric articles further highlights the superior sensitivity of the Antera 3D® camera for purposes of measuring fiber damage as compared to measurements yielded by the PillGrade system.

Referring to FIGS. 4 and 5, visual images of fiber damage between two different fabric articles are provided based upon output from the Antera 3D® camera to further illustrate distinct detection of fiber damage between fiber articles that can be realized by using the Antera 3D® camera. FIG. 4 is an image of the fabric article taken by the Antera 3D® camera after 30 wash/dry cycles using Detergent 5 as represented in TABLE IV above, and FIG. 5 is an image of the fabric article taken by the Antera 3D® camera after 30 wash/dry cycles using Detergent 1w/0.5% Cellulase. As is shown, FIG. 4 illustrates more severe pilling in the imaged fabric article as compared to the fabric article imaged in FIG. 5, thus corroborating the visual distinctions represented by the data in TABLE IV.

Referring to TABLE V below, coefficients of variation, defined as a ratio of a standard deviation to the mean times 100%, were calculated to provide an indication of variability in the measurement techniques used to generate the data in TABLES III and IV, and were also calculated based upon surface roughness values for the fabric articles that were laundered with 30 wash/dry cycles (even though such data is not represented in the TABLES above). Higher coefficients of variation correspond to more variable measurements with lower values for coefficient of variation corresponding to a less variable measurement. As is apparent from the data in TABLE V, data generated using the Antera 3D® camera is subject to considerably less variable than data generated using the PillGrade system, thus even further corroborating the superior differentiation in measuring of fiber damage that can be realized by using the Antera 3D® camera.

TABLE V

| | Coefficient of Variation for Each Measurement Technique | | |
|---|---|---|---|
| | PillGrade | Antera Roughness | Antera Volume Density |
| Detergent 1 w/0.05% Cellulase | 14.22946 | 2.313424745 | 3.760247669 |
| Detergent 1 w/0.1% Cellulase | 11.96084 | 1.729930451 | 3.008300926 |
| Detergent 1 w/0.2% Cellulase | 10.09942 | 2.502208345 | 4.126696726 |
| Detergent 1 w/0.5% Cellulase | 10.67455 | 2.31540348 | 3.814654655 |
| Detergent 1 w/0.5% Cellulase + 1 ppm Chlorine | 14.45452 | 2.130806614 | 3.61921566 |
| Detergent 2 | 10.26742 | 1.52915022 | 2.398086676 |
| Detergent 3 | 13.84709 | 1.907699999 | 2.958616477 |
| Detergent 4 | 10.07104 | 1.9338935 | 3.232622933 |
| Detergent 5 | 18.25473 | 1.603077606 | 2.606824724 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for analyzing a fabric article to determine fiber damage, wherein the method comprises:
   providing the fabric article;
   capturing at least one image of the fabric article using a three-dimensional imaging device;
   processing the at least one image using a contrast function to produce a processed data set representative of fiber damage in a viewing area of the three-dimensional imaging device; and
   producing a processed image based upon the processed data set;
   laundering the fabric article using a first laundry formulation and capturing the at least one image of the fabric article after laundering the fabric article using the laundry formulation;
   providing one or more additional fabric articles;
   laundering the one or more additional fabric articles using modified laundry formulations different from the first laundry formulation;
   capturing at least one image of the one or more additional fabric articles using the three-dimensional imaging device after laundering the one or more additional fabric articles;
   processing the at least one image of the one or more additional fabric articles using the contrast function to produce additional processed data set(s) representative of fiber damage in the viewing area of the three-dimensional imaging device;
   conducting a statistical analysis of the processed data sets from the fabric article and the one or more additional fabric articles; and
   determining that the processed data sets are statistically different and reformulating one or more of the laundry formulations based upon determining that the processed data sets are statistically different.

2. The method of claim 1, wherein capturing the at least one image comprises capturing a plurality of images of the fabric article using the three-dimensional imaging device.

3. The method of claim 2, wherein capturing the plurality of images comprises capturing the plurality of images with a different illumination direction for each of the plurality of images with a constant viewing direction.

4. The method of claim 1, wherein capturing the at least one image comprises suppressing specular reflection from the surface of the fabric article.

5. The method of claim 4, wherein suppressing specular reflection comprises one or more of polarization filtering or selective elimination of data from the data set that is attributable to specular reflection.

6. The method of claim 1, wherein processing the at least one image to produce a processed data set comprises producing the data set including a measurement of at least one variable chosen from surface roughness, elevation density, or depression density.

7. The method of claim 1, further comprising determining that the processed data sets are statistically different using Tukey least squared statistical analysis.

8. The method of claim 1, wherein providing the fabric article comprises providing the fabric article that is free from a stain or extraneous material.

9. The method of claim 1, wherein providing the fabric article comprises providing the fabric article that has been subject to post-production conditions that produce at least some fiber damage in the fabric article.

10. A method for analyzing fiber damage in a fabric article attributable to a laundry formulation, wherein the method comprises:
    providing a fabric article;
    laundering the fabric article using a first laundry formulation;
    capturing at least one image of the fabric article using a three-dimensional imaging device after laundering the fabric article using the first laundry formulation;
    processing the at least one image using a contrast function to produce a processed data set representative of fiber damage in a viewing area of the three-dimensional imaging device; and producing a processed image based upon the processed data set;

repeatedly laundering the fabric article using the first laundry formulation prior to capturing the at least one image of the fabric article;

providing one or more additional fabric articles;

laundering the one or more additional fabric articles using modified laundry formulations different from the first laundry formulation;

capturing at least one image of the one or more additional fabric articles using the three-dimensional imaging device after laundering the one or more additional fabric articles;

processing the at least one image of the one or more additional fabric articles using the contrast function to produce additional processed data set(s) representative of fiber damage in the viewing area of the three-dimensional imaging device;

determining that the processed data sets are statistically different and reformulating one or more of the laundry formulations based upon determining that the processed data sets are statistically different.

11. A system for analyzing fabric articles, wherein the system comprises:

a first fabric article and a second fabric article;

a first laundry formulation and a second laundry formulation, wherein the second laundry formulation is different from the first laundry formulation;

a laundry machine;

wherein the laundry machine is configured to launder the first fabric article by use of the first laundry formulation to produce a first laundered fabric article, and wherein the laundry machine is configured to launder the second fabric article by use of the second laundry formulation to produce a second laundered fabric article; and a three-dimensional imaging device, wherein the imaging device comprises a viewing area, a plurality of separate illumination sources, and a computer processor, wherein the viewing area is configured for placing the first or the second laundered fabric article, wherein the plurality of separate illumination sources are positioned and configured to illuminate the first laundered fabric article placed in the viewing area from different angles so as to capture images of the first laundered fabric article through a photometric stereo technique; and wherein the computer processor is configured to process the images of the first fabric article using a contrast function to produce a first set of processed data set representative of fiber damage of the first laundered fabric article;

wherein the plurality of separate illumination sources are positioned and configured to illuminate the second laundered fabric article placed in the viewing area from different angles so as to capture images of the second laundered fabric article through a photometric stereo technique;

and wherein the computer processor is configured to process the images of the second fabric article using a contrast function to produce a second set of processed data set representative of fiber damage of the second laundered fabric article; and wherein the processor is configured to determine whether the first and the second processed data sets are statistically different.

12. The system of claim 11, wherein the three-dimensional imaging device further comprises an arrangement of filters configured to minimize capture of specular reflection.

13. The system of claim 11, wherein the computer processer is further configured to produce a processed image based upon the first or the second processed data set.

* * * * *